United States Patent
Miyamoto

(10) Patent No.: US 7,518,650 B2
(45) Date of Patent: Apr. 14, 2009

(54) IMAGE REPRODUCING METHOD AND IMAGE REPRODUCING APPARATUS

(75) Inventor: Takashi Miyamoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 609 days.

(21) Appl. No.: 11/080,467

(22) Filed: Mar. 16, 2005

(65) Prior Publication Data

US 2005/0206733 A1    Sep. 22, 2005

(30) Foreign Application Priority Data

Mar. 17, 2004   (JP)   ............................. 2004-077011

(51) Int. Cl.
*H04N 5/222*   (2006.01)
(52) U.S. Cl. .............................. 348/333.05; 348/333.02
(58) Field of Classification Search ............ 348/333.05, 348/211.2, 333.01, 333.02, 333.11, 333.12
See application file for complete search history.

(56) References Cited

U.S. PATENT DOCUMENTS

| 6,437,797 | B1 | 8/2002 | Ota | |
|---|---|---|---|---|
| 2003/0122940 | A1* | 7/2003 | Myojo | 348/231.2 |
| 2004/0189813 | A1* | 9/2004 | Tanaka | 348/207.99 |
| 2006/0187317 | A1* | 8/2006 | Montulli et al. | 348/231.5 |

FOREIGN PATENT DOCUMENTS

| JP | 11122638 A | * | 4/1999 |
|---|---|---|---|
| JP | 2004048427 A | * | 2/2004 |

* cited by examiner

*Primary Examiner*—Tuan V Ho
*Assistant Examiner*—Jason Whipkey
(74) *Attorney, Agent, or Firm*—Birch, Stewart, Kolasch & Birch, LLP

(57) ABSTRACT

A personal computer loads image data with tag information, which includes position coordinates of an image capture position and a camera azimuth, from an electronic camera. A thumbnail image, which is a reduced image of the loaded image, is rotated in a camera azimuth direction and composited to a position, which corresponds to the position coordinates, on an electronic map. A composite electronic map, which is composited with the thumbnail image, is displayed in a monitor of the personal computer.

13 Claims, 6 Drawing Sheets

IMAGE REPRODUCING METHOD AND IMAGE REPRODUCING APPARATUS

BACKGROUND OF THE INVENTION

1. Field of the Invention

The present invention relates to an image reproducing method and an image reproducing apparatus for generating a composite electronic map by embedding thumbnail images of captured main images into corresponding image capture positions on an electronic map.

2. Background Arts

Digital cameras with a GPS (Global Positioning System) are well-known. Captured main images are stored in a memory card of the digital camera in correlation with position information detected by the GPS. There is an image reproducing method in which the main images and the corresponding position information are loaded to a computer, and thumbnail images of the captured main images are embedded into corresponding image capture positions on an electronic map and displayed (such as disclosed in U.S. Pat. No. 6,437,797).

SUMMARY OF THE INVENTION

An object of the present invention is to provide an image reproducing method and an image reproducing apparatus for easily identifying a camera azimuth of a captured image when reproducing the image.

In order to achieve the above and other objects of the present invention, the image reproducing method according to the present invention generates a composite electronic map by rotating a thumbnail image of a main image in a camera azimuth direction and embedding the rotated thumbnail image into a corresponding image capture position on an electronic map. The composite electronic map is displayed in a display. The electronic map is generated from map information to form a desired area including the image capture position. The composite electronic map is stored in a memory.

Further, the main image is displayed instead of the composite electronic map in the display by designating the thumbnail image on the composite electronic map.

A main image is an image captured by an electronic camera with a GPS. A recording medium of the electronic camera has at least one file including an image area and a tag area. In the image area, the main image and the thumbnail image are stored. In the tag area, the image capture position information and the camera azimuth information are stored.

An image reproducing apparatus according to the present invention includes the following: an inputting means for inputting the main image along with the image capture position information and the camera azimuth information which are related to the main image; an electronic map generating means for generating a desired electronic map from the map information on the basis of the image capture position information; a rotating means for rotating the thumbnail image of the main image on the basis of the camera azimuth information; an image compositing means for generating the composite electronic map by embedding the thumbnail image into the corresponding image capture position on the electronic map before or after rotating the thumbnail image; and the display for displaying the composite electronic map. The inputting means is connected to the electronic camera with the GPS. The main image and the thumbnail image are loaded from the recording medium of the electronic camera along with the image capture position information and the camera azimuth information which are related to the main image.

According to the image reproducing method and the image reproducing apparatus of the present invention, the thumbnail image, which is the reduced image, is rotated in the camera azimuth direction, composited to a corresponding position to the position coordinates of the image capture position, and displayed. Therefore, the camera azimuth is visually identified.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus do not limit the present invention. In the drawings, the same reference numerals designate like or corresponding parts throughout the several views, and wherein.

DETAILED DESCRIPTION OF THE EMBODIMENTS

Figure 1:
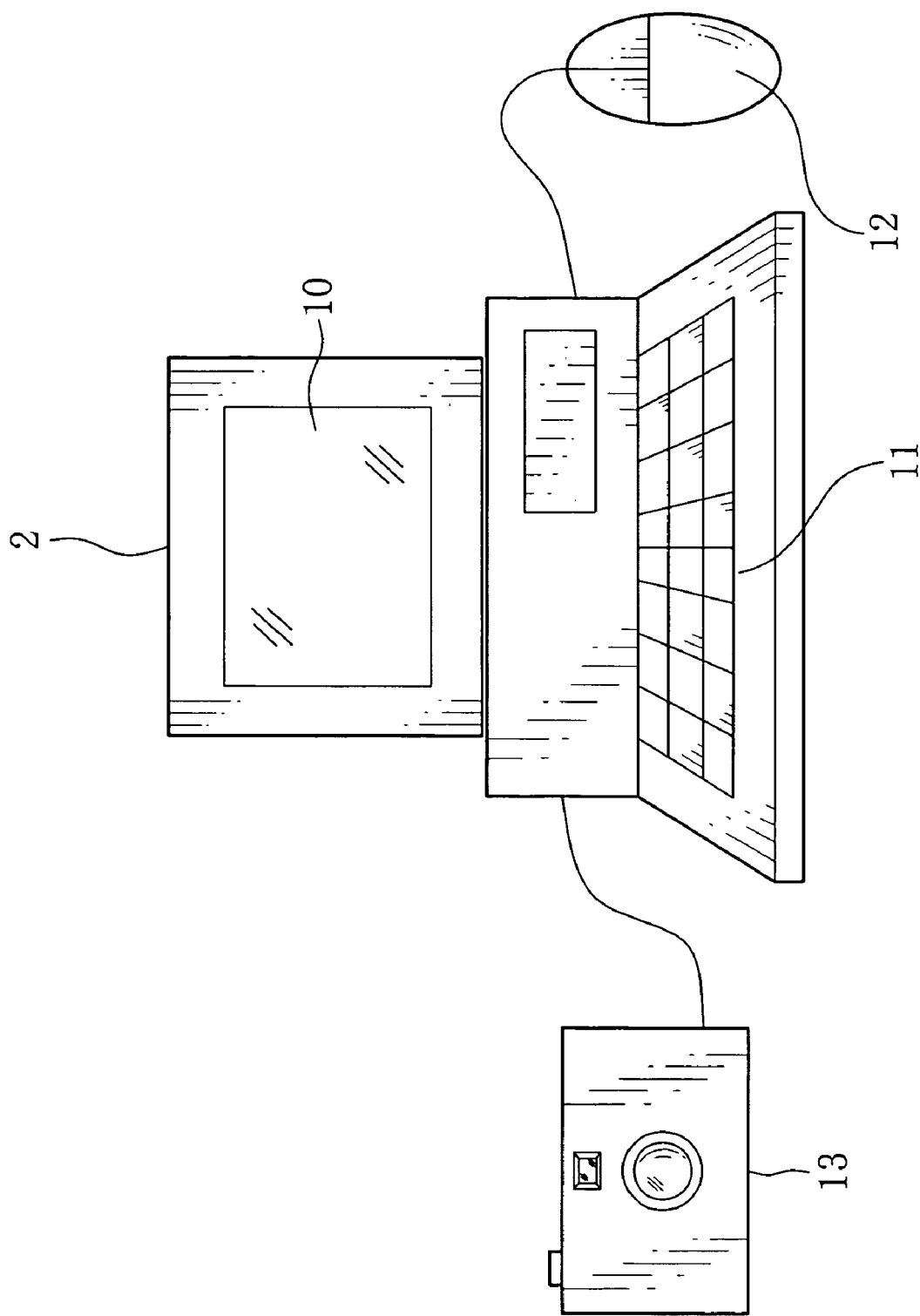
FIG. 1 is an explanatory view showing a state in which a personal computer and a digital camera are connected each other.

In FIG. 1, a personal computer 2 (hereinafter referred to as the PC 2), which functions as an image reproduction apparatus, comprises a monitor 10, a keyboard 11 and a mouse12. The personal computer 2 is connected to a digital camera 13 via a USB cable.

Figure 2:
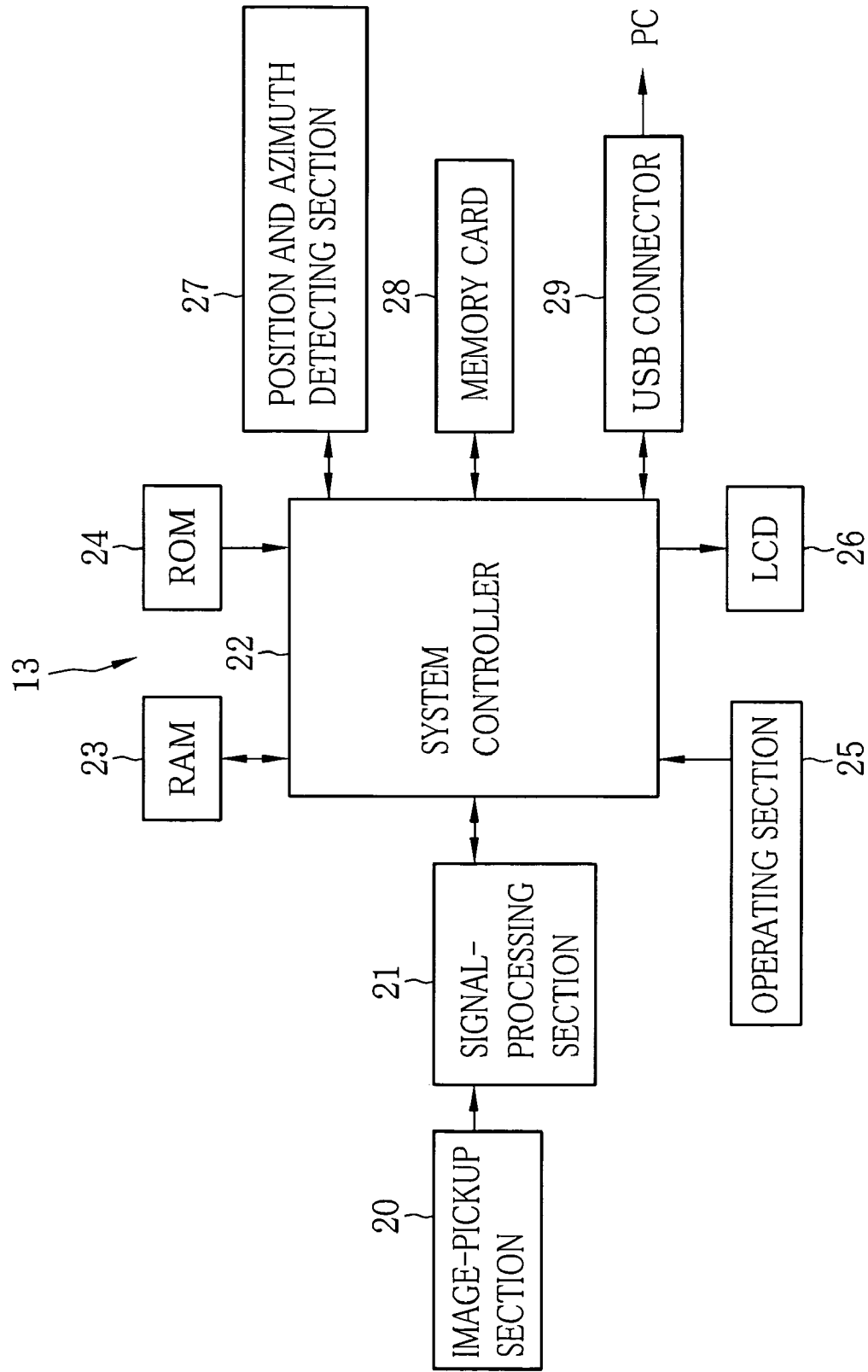
FIG. 2 is a block diagram showing a schematic configuration of the digital camera.

As shown in FIG. 2, the digital camera 13 is constituted of an image pickup section 20, a signal processing section 21 and a system controller 22. The image pickup section 20 includes an image pickup lens and a CCD sensor as well-known, and converts subject light entering from the image pickup lens into image signals via the CCD sensor. The signal processing section 21 performs A/D conversion to the image signals outputted from the image pickup section 20 and converts them into digital image data, and then sends the digital image data to a system controller 22.

The system controller 22 performs gradation conversion, white balance correction, gamma correction and YC conversion to the digital image data sent from the signal processing section 21. A RAM 23, a ROM 24, an operating section 25, an LCD 26, a position/azimuth detecting section 27, a memory card 28 and a USB connector 29 are connected to the system controller 22. Various control programs and setting information are recorded in the ROM 24. The system controller 22 loads such information from the ROM 24 to the RAM 23, which is a working memory, to execute various processing. In addition to functioning as the working memory, the RAM 23 also functions as a buffer memory which temporarily stores the digital image data outputted from the signal processing section 21. The operating section 25 comprises a power supply switch of the digital camera 13, a shutter release button, a zoom adjustment switch for changing zoom magnification of the image pickup lens, a menu button for displaying a menu screen in the LCD 26, a cursor operating button for moving the cursor in the menu screen and an enter button which is operated for selecting an item. The system controller 22 controls the operation of each section of the digital camera 13 according to instructions from the operating section 25.

The LCD 26 displays through images for observation, captured images and various menu screens. A GPS, which detects position coordinates (the latitude and longitude, for instance) of an image capture position at predetermined intervals, and an electronic compass, which detects a camera azimuth when a subject is captured, are incorporated in the position/azimuth detecting section 27. The image is captured upon depressing the shutter release button. The captured image data is subjected to various image processing, compressed in a predetermined format (JPEG format, for instance) in the system controller 22 and recorded in a memory card 28. When reproducing the image, the image data recorded in the memory card 28 is sent to the PC 2 via the USB connector 29.

Figure 3:
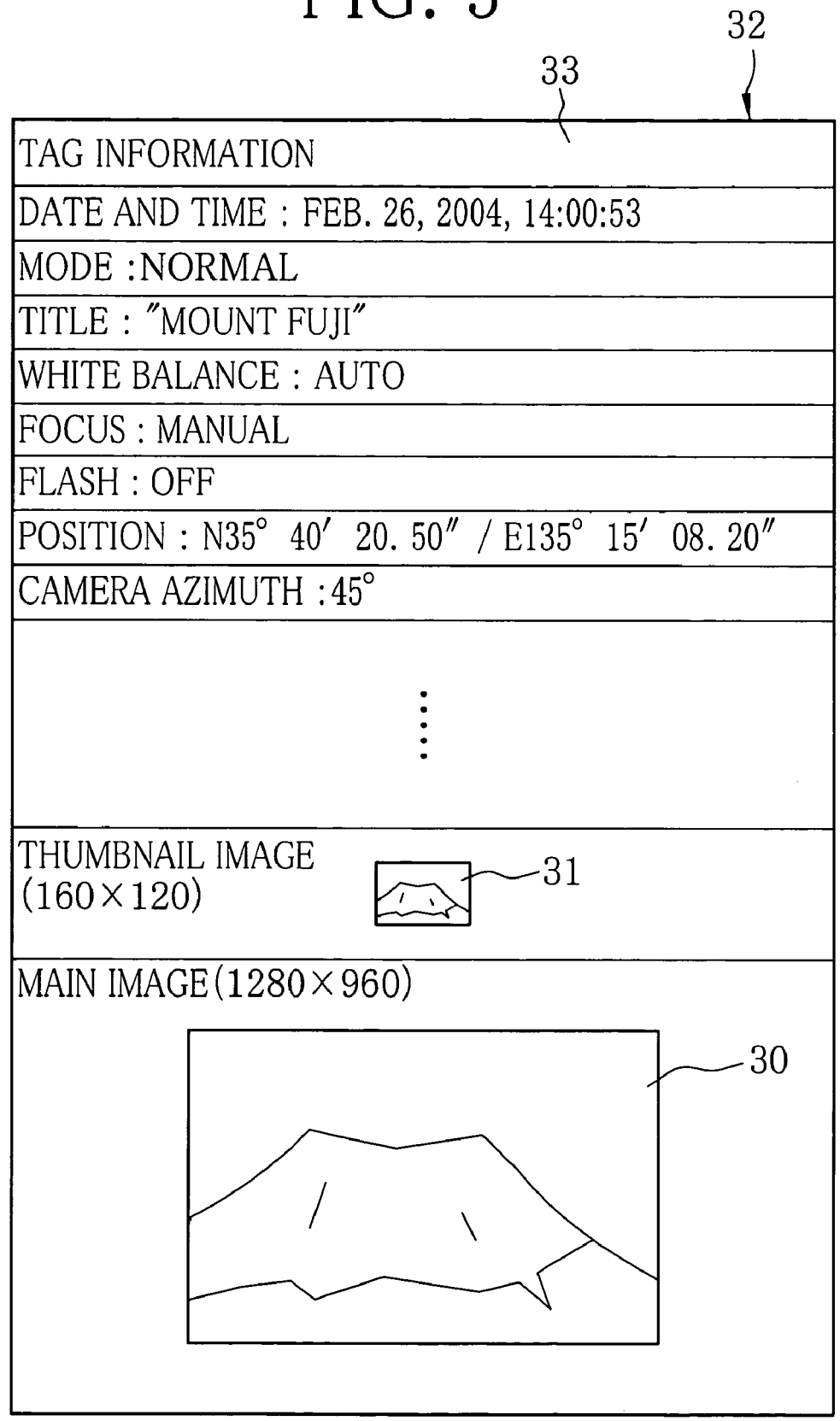
FIG. 3 is an explanatory view showing a configuration of an image data file.

In FIG. 3, the system controller 22 attaches the position coordinates of the image capture position and the camera azimuth, which are detected by the position/azimuth detecting section 27, to a tag information (Exif tag) 33 of an image data file 32 along with a captured image (a main image) 30 and a thumbnail image 31 which is a reduced image of the captured image 30. The system controller 22 records the tag information 33 in the memory card 28. The camera azimuth ranges between 0° and 359.99° with respect to the north, for instance.

Figure 4:
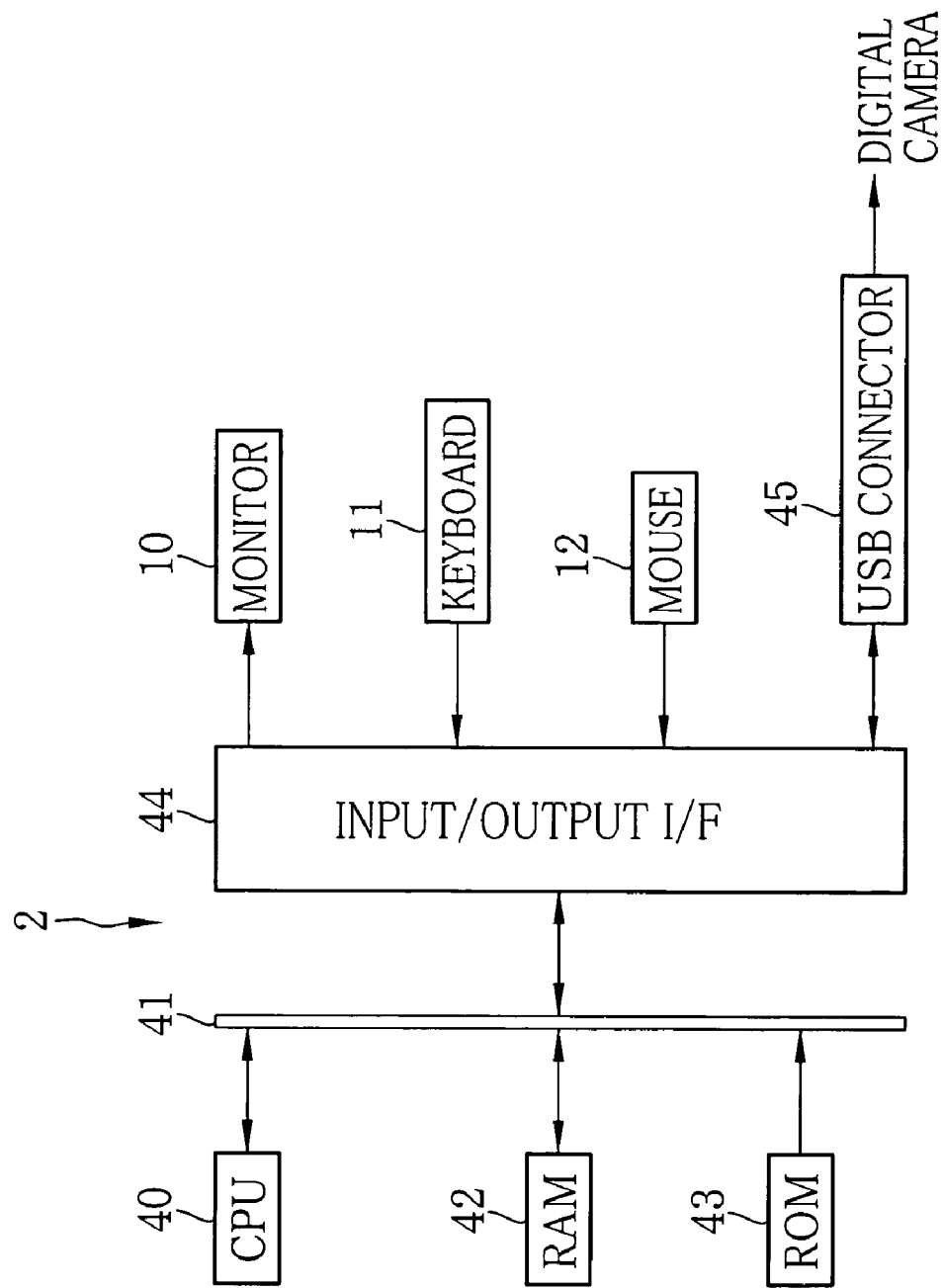
FIG. 4 is a block diagram showing a schematic configuration of the personal computer.

In FIG. 4, CPU 40 controls overall operation of the PC 2. The CPU 40 is connected to a RAM 42, a ROM 43 and an input and output I/F 44 via a bus 41. The image data sent from the digital camera 13 and an electronic map 50 (see FIG. 5), which is with the thumbnail image 31 embedded therein, are stored in the RAM 42. The ROM 43 is pre-installed with a program necessary for starting the PC 2 and an image reproducing program for generating the electronic map 50 on the basis of the image data loaded from the digital camera 13.

The monitor 10, the keyboard 11, the mouse 12 and a USB connector 45 are connected to the input and output I/F 44 (see FIG. 1). The monitor 10 displays the main image 30 and the electronic map 50 which is with the thumbnail image 31 embedded therein. The keyboard 11 and the mouse 12 are operated for starting the image reproducing program and generating the electronic map 50. The image data is received from the digital camera 13 via the USB connector 45.

The CPU 40 analyzes the tag information 33 of the image data, which is loaded from the digital camera 13, to determine whether the camera azimuth is attached to the tag information 33 or not. When the camera azimuth is attached to the tag information 33, the CPU 40 loads an electronic map, which includes the position coordinates representing the image capture position, with a proper scale from a map data file in the image reproducing program. Then, the thumbnail image 31 is rotated in the camera azimuth direction in such a way that an upper side of the thumbnail image 31 faces the subject when viewed from the operator's side and embedded in a corresponding position to the position coordinates on the electronic map. On the other hand, when the camera azimuth has not been attached to the tag information 33, the CPU 40 embeds the thumbnail image 31 in the corresponding position to the position coordinates on the electronic map without rotating the thumbnail image 31.

Figure 5:
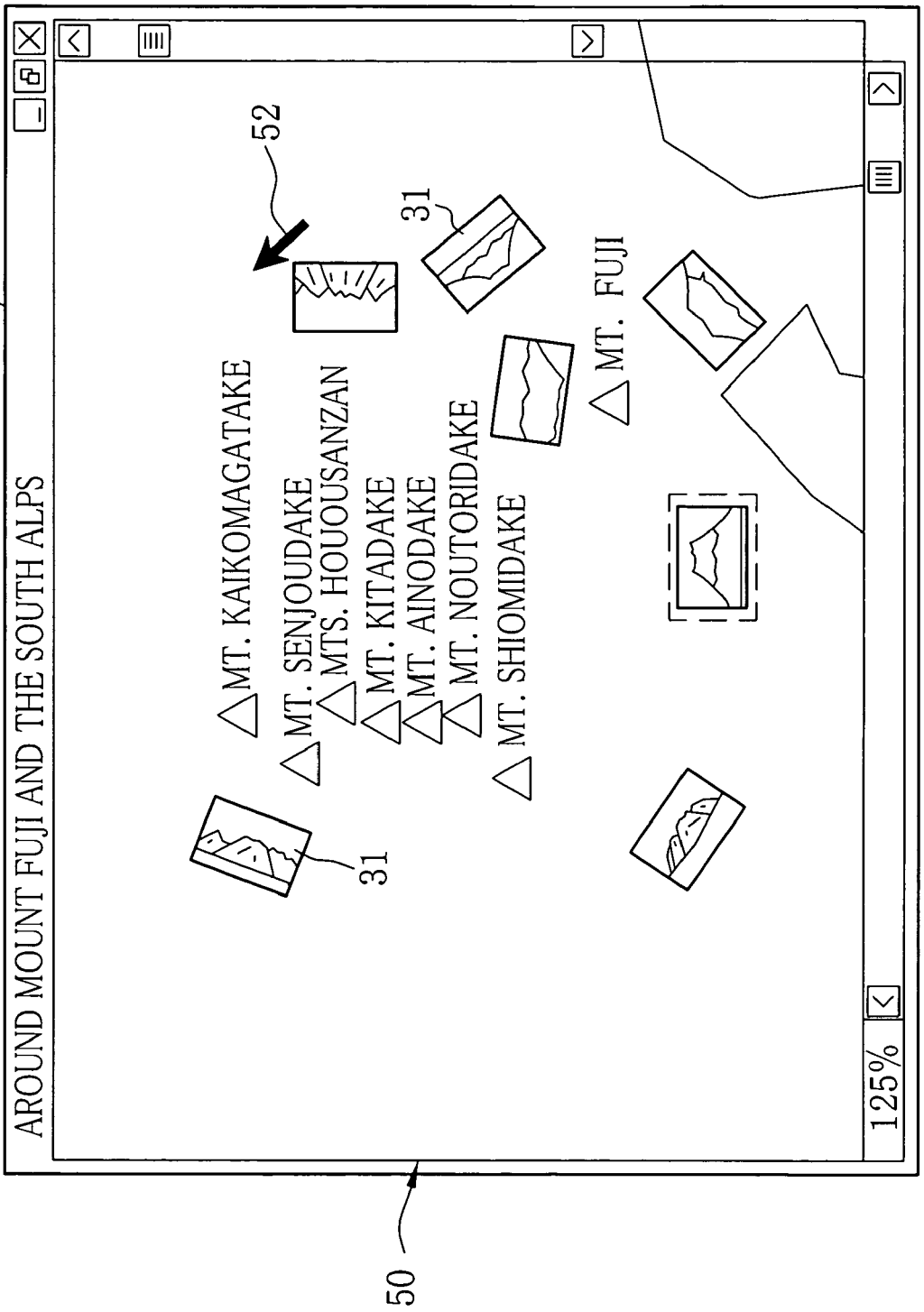
FIG. 5 is an explanatory view showing a window of an electronic map with embedded thumbnail images.

After embedding the thumbnail image 31, the CPU 40 displays a window 51 of the electronic map 50 as shown in FIG. 5. The thumbnail image 31 of the image data with the camera azimuth attached to the tag information 33 is rotated in the camera azimuth direction and displayed in the electronic map 50. On the other hand, the thumbnail image 31 without the camera azimuth is embedded in the electronic map 50 such that respective horizontal lines of the display screen of the monitor 10 and the image frame are parallel, and respective vertical lines of the display screen of the monitor 10 and the image frame are parallel, as shown in dashed lines. With a cursor 52 placed on the thumbnail image 31, double clicking on the mouse 12 opens a window of the main image 30. At the same time, the main image 30 is displayed in the monitor 10 in a large size. The main image 30 is displayed such that the respective horizontal lines of the display screen of the monitor 10 and the image frame are parallel, and respective vertical lines of the display screen of the monitor 10 and the image frames are parallel.

Figure 6:
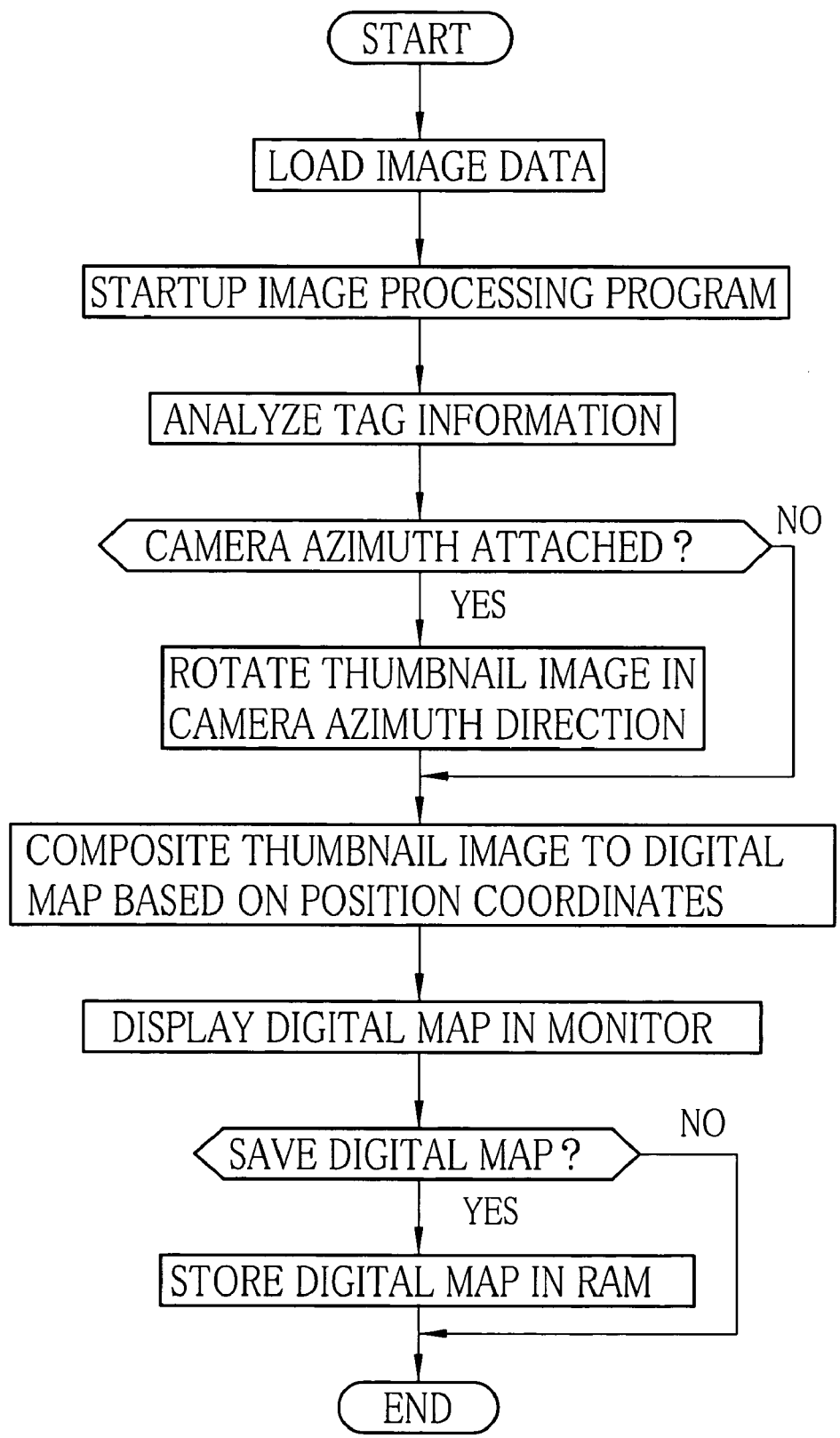
FIG. 6 is a flowchart showing an image reproduction process of the personal computer.

Next, an operation of the PC 2 of the above configuration is described while referring to a flowchart of FIG. 6. First, the PC 2 and the digital camera 13 are connected each other via the USB connectors 29 and 45. The power of the digital camera 13 is turned on to load the image data recorded in the memory card 28 in the RAM 42 of the PC 2.

When the image reproducing program is started after loading the image data, the tag information 33 of the loaded image data is analyzed in the CPU 40, and determined whether the camera azimuth is attached or not.

When the camera azimuth is attached to the tag information 33, the electronic map 50, which includes the position coordinates representing the image capture position, with a proper scale is loaded from the map data file in the image reproducing program to the CPU 40. The CPU 40 rotates the thumbnail image 31 in the camera azimuth direction such that the upper side of the thumbnail image 31 faces the subject, and the thumbnail image 31 is embedded in the electronic map 50 at the corresponding position to the position coordinates of the image capture position. On the other hand, when the camera azimuth is not attached to the tag information 33, the thumbnail image 31 is embedded in the electronic map 50 at the corresponding position to the position coordinates of the image capture position without being rotated.

The window 51 of the electronic map (a composite electronic map) 50, which has the embedded thumbnail images 31, is displayed in the monitor 10. Thereafter, the electronic map 50 is stored in the RAM 42 when instructed.

As described above, the thumbnail image 31 is rotated in the camera azimuth direction and composited to the electronic map 50, and the composite electronic map 50 is displayed in the monitor 10. Thus, the camera azimuth of the subject is visually apparent and easily identified.

In the above embodiment, the digital camera 13 includes the position/azimuth detecting section 27, and automatically attaches the position coordinates of the image capture position and the camera azimuth to the tag information 33. However, the digital camera does not necessarily require the position/azimuth detecting section. A user can also input the position coordinates of the image capture position and the camera azimuth for attaching them to the tag information 33 concurrently with loading the image data in the PC 2.

Further, it is also possible to use other images than these captured by the digital camera 13, provided the position coordinates of the image capture position and the camera azimuth are attached to them as associated information. The present invention can also be applied to the images captured by other image pickup apparatus such as a cellular phone with a camera, and images which can be viewed on the Internet.

In the above embodiment, the PC 2 is used as the image reproducing apparatus. However, it is also possible to use a server, which is connected to the PC 2 via the Internet, as the image reproducing apparatus. The server generates electronic maps 50 which correspond to image data uploaded by an indefinite number of users.

Although the present invention has been described with respect to the preferred embodiment, the present invention is not to be limited to the above embodiment but, on the contrary, various modifications will be possible to those skilled in the art without departing from the scope of claims appended hereto.

What is claimed is:

1. An image reproducing method comprising the steps of:
    receiving a main image, wherein at least one of image capture position information and camera azimuth information are associated with the main image;
    determining whether the azimuth information was received with the main image;
    generating a desired two-dimensional electronic map from map information on the basis of said image capture position information, said electronic map including an image capture position of said main image;
    rotating a thumbnail image, which is a reduced image of said main image, on the basis of said camera azimuth information if it is determined that the azimuth information was received with the main image;
    generating a composite two-dimensional electronic map by embedding said thumbnail image into a corresponding image capture position on said electronic map; and
    displaying said composite electronic map in a display.

2. An image reproducing method as claimed in claim 1, said image reproducing method further comprising the step of storing said composite electronic map in a memory.

3. An image reproducing method as claimed in claim 2, said image reproducing method further comprising the step of displaying said main image instead of said composite electronic map by designating said thumbnail image on said composite electronic map.

4. An image reproducing method as claimed in claim 1, wherein said main image is captured by an electronic camera with a GPS and stored in a recording medium, said GPS generates said image capture position information and said camera azimuth information of said main image.

5. An image reproducing method as claimed in claim 4, wherein said recording medium comprises at least one file, which has an image area and a tag area, said main image and said thumbnail image are stored in said image area, said image capture position information and said camera azimuth information are stored in said tag area.

6. The image reproducing method as claimed in claim 1, wherein said thumbnail image is rotated such that an upper side of said thumbnail image faces a position of a subject of said main image on said electronic map.

7. The image reproducing method as claimed in claim 1, wherein the thumbnail image is not rotated if it is determined that the azimuth angle information was not received with the main image.

8. An image reproducing apparatus comprising:
    an inputting device for receiving a main image along with at least one of an image capture position information and camera azimuth information, which are related to said main image;
    an electronic map generating device for generating a desired two-dimensional electronic map from map information on the basis of said image capture position information, said electronic map including said image capture position of said main image;
    a rotating device for determining whether the azimuth information is received with the main image and rotating a thumbnail image, which is a reduced image of said main image, on the basis of said camera azimuth information if it is determined that the camera azimuth information is received with the main image;
    an image compositing device for generating a composite two-dimensional electronic map by embedding said thumbnail image into a corresponding image capture position on said electronic map before or after rotating said thumbnail image; and
    a display for displaying said composite electronic map.

9. An image reproducing apparatus as claimed in claim 8, said image reproducing apparatus further comprising a memory for storing said composite electronic map.

10. An image reproducing apparatus as claimed in claim 9, said image reproducing apparatus further comprising a designating device for designating said thumbnail image on said composite electronic map, said main image being displayed in said display instead of said composite electronic map when said designating device designates said thumbnail image.

11. An image reproducing apparatus as claimed in claim 10, wherein said inputting device is connected to an electronic camera with a GPS, said main image and said thumbnail image along with said image capture position information and said camera azimuth information, which are related to said main image, are loaded from a recording medium of said electronic camera.

12. An image reproducing apparatus as claimed in claim 11, wherein said recording medium stores at least one file, said file has an image area and a tag area, said main image and said thumbnail image are stored in said image area, said image capture position information and said camera azimuth information are stored in said tag area.

13. The image reproducing apparatus as claimed in claim 8, wherein the thumbnail image is rotated such that an upper side of said thumbnail image faces a position of a subject of said main image on said electronic map.

* * * * *